(12) United States Patent
Huang

(10) Patent No.: US 9,680,788 B2
(45) Date of Patent: Jun. 13, 2017

(54) METHOD, APPARATUS, AND SYSTEM FOR AUTOMATICALLY PROMPTING USER TO SIGN UP FOR MICROBLOG

(71) Applicant: TENCENT TECHNOLOGY (SHENZHEN) COMPANY LIMITED, Shenzhen (CN)

(72) Inventor: Lihua Huang, Shenzhen (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 290 days.

(21) Appl. No.: 14/695,198

(22) Filed: Apr. 24, 2015

(65) Prior Publication Data
US 2015/0229600 A1    Aug. 13, 2015

Related U.S. Application Data

(63) Continuation of application No. PCT/CN2013/083903, filed on Sep. 22, 2013.

(51) Int. Cl.
*G06F 15/16* (2006.01)
*H04L 12/58* (2006.01)
(Continued)

(52) U.S. Cl.
CPC ........ *H04L 51/32* (2013.01); *G06F 17/30339* (2013.01); *G06F 17/30864* (2013.01);
(Continued)

(58) Field of Classification Search
CPC ............................ H04L 51/32; G06F 17/30839
(Continued)

(56) References Cited

U.S. PATENT DOCUMENTS 8,086,680 B2    12/2011  Boutboul et al.
2014/0019615 A1*  1/2014  Jennings ........... G06F 17/30144
                                                 709/224

FOREIGN PATENT DOCUMENTS

CN    101309190 A    11/2008
CN    102025657 A    4/2011
(Continued)

OTHER PUBLICATIONS

International Search Report for Application No. PCT/CN2013/083903 dated Dec. 26, 2013, and its English translation thereof.
(Continued)

*Primary Examiner* — Glenford Madamba
(74) *Attorney, Agent, or Firm* — Harness, Dickey & Pierce, P.L.C.

(57) ABSTRACT

A method, apparatus, and system for automatically prompting a user to sign up for a microblog. The method includes acquiring follow requests that are sent by multiple microblog users to a to-be-invited use. The method also includes creating pre-follow relationships according to the follow requests, and saving the pre-follow relationships between the to-be-invited user and the microblog users that send the follow requests, to generate a pre-follow relationship table. The method also includes sending, in a case in which the number of all pre-follow relationships corresponding to the to-be-invited user is greater than or equal to a first threshold, a prompt message to the to-be-invited user, so as to prompt the to-be-invited user to sign up for the microblog.

16 Claims, 4 Drawing Sheets

(51) Int. Cl.
*G06Q 10/10* (2012.01)
*G06Q 30/02* (2012.01)
*G06F 17/30* (2006.01)
G06Q 50/00 (2012.01)
H04L 12/18 (2006.01)

(52) U.S. Cl.
CPC ....... *G06F 17/30867* (2013.01); *G06Q 10/10* (2013.01); *G06Q 30/02* (2013.01); *G06Q 50/01* (2013.01); *H04L 12/1818* (2013.01)

(58) Field of Classification Search
USPC .................................................. 709/206, 224
See application file for complete search history.

(56) References Cited

FOREIGN PATENT DOCUMENTS

| | | |
|---|---|---|
| CN | 102377763 A | 3/2012 |
| CN | 102461129 A | 5/2012 |
| CN | 102668514 A | 9/2012 |

OTHER PUBLICATIONS

Chinese Office Action for Application No. 2012104104087 dated Apr. 6, 2016, and an English concise explanation of relevance thereof.
International Preliminary Report for Application No. PCT/CN2013/083903 dated Apr. 25, 2015.

\* cited by examiner

METHOD, APPARATUS, AND SYSTEM FOR AUTOMATICALLY PROMPTING USER TO SIGN UP FOR MICROBLOG

CROSS-REFERENCE TO RELATED APPLICATIONS

This application is a continuation of International Application No. PCT/CN2013/083903, filed on Sep. 22, 2013. This application claims the benefit and priority of Chinese Application No. 201210410408.7, filed on Oct. 24, 2012. The entire disclosures of each of the above applications are incorporated herein by reference.

FIELD

The present disclosure relates to a method, an apparatus, and a system for automatically prompting a user to sign up for a microblog.

BACKGROUND

This section provides background information related to the present disclosure which is not necessarily prior art.

With the development of computer networks and communications technologies, the Internet provides, by means of a microblog, a network user with an information sharing, propagation, and acquisition platform that is based on a user relationship. The network user may log in to the microblog by means of a webpage, post personal information in the microblog, and share the posted information with microblog users who follow the network user. Therefore, with the microblog, users can share information with each other anytime and anywhere by means of networks and information transfer in this manner has a high efficiency and is widely applied.

In the existing technology, a microblog user maintains and manages a following list. All users in the following list have signed up for the microblog and all users followed by the microblog user are stored in the following list. The microblog user may follow, according to personal requirements, information shared by the microblog users in the following list. That is, the microblog user on the network may receive, in real time by using various microblog clients, microblog information posted or reposted by other microblog users in the following list.

While using a microblog, a microblog user usually wants to follow, according to requirements, people with social influence such as politicians, writers, famous singers, or movie stars, and wants to follow relevant information pertaining to these people. However, these people that have attracted considerable attention have not joined the microblog for a variety of reasons, and therefore, some approaches are required to invite these celebrities to join the microblog. Currently, these celebrities are usually invited to sign up for the microblog using an offline approach. For example, in a form such as offline promotion or through business cooperation. These types of invitation approaches have a high cost and a low success rate.

SUMMARY

This section provides a general summary of the disclosure, and is not a comprehensive disclosure of its full scope or all of its features.

The existing technology for inviting a user to sign up for a microblog has a high cost and a low success rate. No effective solution has been proposed yet.

According to various embodiments, a method for automatically prompting a user to sign up for a microblog is provided. The method includes acquiring follow requests that are sent by multiple microblog users to a to-be-invited user; creating pre-follow relationships according to the follow requests, and saving the pre-follow relationships between the to-be-invited user and the microblog users that send the follow requests to generate a pre-follow relationship table; and sending, in a case in which the number of all pre-follow relationships corresponding to the to-be-invited user is greater than or equal to a first threshold, a prompt message to the to-be-invited user, so as to prompt the to-be-invited user to sign up for the microblog.

After sending a prompt message to the to-be-invited user, so as to prompt the to-be-invited user to sign up for the microblog, the method includes sending, after detecting that the to-be-invited user has signed up to obtain a corresponding microblog account, feedback messages to accounts of the microblog users that have the pre-follow relationships with the to-be-invited user, and converting the pre-follow relationships between the microblog users and the to-be-invited user into follow relationships according to the feedback messages.

After sending a prompt message to the to-be-invited user, so as to prompt the to-be-invited user to sign up for the microblog, the method includes determining whether the to-be-invited user has signed up to obtain a corresponding microblog account, where in a case in which the to-be-invited user has signed up to obtain the corresponding microblog account, the microblog users that have the pre-follow relationships with the to-be-invited user are enabled to follow microblog information of the to-be-invited user, and in a case in which the to-be-invited user has not signed up to obtain the corresponding microblog account, perform continuing to count the number of the pre-follow relationships corresponding to the to-be-invited user.

In a case in which the to-be-invited user has signed up to obtain the corresponding microblog account, enabling the microblog users that have the pre-follow relationships with the to-be-invited user and following microblog information of the to-be-invited user is performed, and in a case in which the to-be-invited user has not signed up to obtain the corresponding microblog account, continuing to count the number of the pre-follow relationships corresponding to the to-be-invited user is performed.

The pre-follow relationship table includes all pre-follow relationships corresponding to each of the to-be-invited users and after the pre-follow relationship table is generated, the method includes acquiring, according to the pre-follow relationships recorded in the pre-follow relationship table, information of all the to-be-invited users corresponding to each microblog user, so as to acquire a to-be-invited user list and a to-be-invited user dictionary that correspond to the microblog user; saving, in a memory and/or database, the to-be-invited user list and the to-be-invited user dictionary that correspond to the microblog user; reading an identifier (ID) of the to-be-invited user from the to-be-invited user dictionary after the microblog user is enabled to follow the microblog information of the to-be-invited user; and creating a corresponding relationship between the ID of the to-be-invited user and the microblog account.

Before acquiring follow requests that are sent by multiple microblog users to a to-be-invited user, the method includes receiving the follow requests of the microblog users by using an inviting port and determining whether the microblog users have joined the microblog.

In a case in which the microblog users have joined the microblog, creating and saving pre-follow relationships between the to-be-invited user and the microblog users that send the follow requests, to generate a pre-follow relationship table is performed and in a case in which the microblog users have not joined the microblog, the microblog users are prompted to sign up for the microblog, and after the microblog users sign up for the microblog, the step of creating and saving pre-follow relationships between the to-be-invited user and the microblog users that send the follow requests, to generate a pre-follow relationship table is performed.

Accordingly, according to various embodiments, an apparatus for automatically prompting a user to sign up for a microblog is provided. The apparatus includes:

an acquiring module, configured to acquire follow requests that are sent by multiple microblog users to a to-be-invited user.

a processing module, configured to create pre-follow relationships according to the follow requests, and save the pre-follow relationships between the to-be-invited user and the microblog users that send the follow requests, to generate a pre-follow relationship table; and a prompting module, configured to send, in a case in which the number of all pre-follow relationships corresponding to the to-be-invited user is greater than or equal to a first threshold, a prompt message to the to-be-invited user, so as to prompt the to-be-invited user to sign up for the microblog.

The apparatus further includes:

a sending module, configured to send feedback messages to the microblog users that have the pre-follow relationships with the to-be-invited user; and a converting module, configured to convert the pre-follow relationships between the microblog users and the to-be-invited user into follow relationships according to the feedback messages so that the microblog users are enabled to follow microblog information of the to-be-invited user.

The apparatus further includes:

a determining module, configured to determine whether the to-be-invited user has signed up to obtain a corresponding microblog account.

The apparatus further includes:

an enabling module, configured to enable, in a case in which the to-be-invited user has signed up to obtain the corresponding microblog account, the microblog users that have the pre-follow relationships with the to-be-invited user to follow microblog information of the to-be-invited user.

The apparatus further includes:

an executing module, configured to return to execute a counting module in a case in which the to-be-invited user has not signed up to obtain the corresponding microblog account.

Accordingly, in order to achieve the forgoing objective, according to various embodiments, a system for automatically prompting a user to sign up for a microblog is provided. The system includes:

one or more user servers, configured to save all information of a to-be-invited user and provide an inviting port to receive follow requests of microblog users; and a microblog server, which establishes communication with any one or more user servers, and is configured to acquire the following requests: create pre-follow relationships according to the follow requests and save the pre-follow relationships between the to-be-invited user and the microblog users that send the follow requests, in a case in which the number of all pre-follow relationships corresponding to the to-be-invited user is greater than or equal to a first threshold, a prompt message being sent to the to-be-invited user, so as to prompt the to-be-invited user to sign up for the microblog.

The microblog server includes a first processor, configured to determine whether the to-be-invited user has signed up to obtain a corresponding microblog account, where in a case in which the to-be-invited user has signed up to obtain the corresponding microblog account, the microblog users that have the pre-follow relationships with the to-be-invited users are enabled to follow microblog information of the to-be-invited user.

The system further includes an editing terminal, configured to acquire, according to the pre-follow relationships, a to-be-invited user list and a to-be-invited user dictionary that correspond to each microblog user, where when the microblog user is enabled to follow the microblog information of the to-be-invited user, an identifier (ID) of the to-be-invited user is read from the to-be-invited user dictionary and a corresponding relationship between the ID of the to-be-invited user in the to-be-invited user dictionary and the microblog account is created.

The user server includes:

the inviting port, configured to receive the follow requests of the microblog users; and a second processor, configured to determine whether the microblog users have joined the microblog, where in a case in which the microblog users have not joined the microblog, the microblog users are prompted to sign up for the microblog.

As described in the foregoing description, follow requests that are sent by multiple microblog users to a to-be-invited user are acquired; pre-follow relationships between the to-be-invited user and the microblog users that send the follow requests are created according to the follow requests and saved, to generate a pre-follow relationship table; and, in a case in which the number of all pre-follow relationships corresponding to the to-be-invited user is greater than or equal to a first threshold, a prompt message may be sent to the to-be-invited user, so as to prompt the to-be-invited user to sign up for the microblog. In the forgoing description of features, after a to-be-invited user receives a follow request sent by a microblog user, the follow request is acquired and a pre-follow relationship between the to-be-invited user and the microblog user that sends the follow request is created. Because the to-be-invited user receives follow requests of a large number of microblog users and each microblog user sends follow requests to different to-be-invited users, the generated pre-follow relationship table records all pre-follow relationships corresponding to each to-be-invited user. A system counts the current number of all pre-follow relationships corresponding to each to-be-invited user and generates and provides prompt information to the to-be-invited user when the number is greater than or equal to a predetermined threshold, and thus, the to-be-invited user joins the microblog according to the prompt information. Therefore, such an invitation approach does not involve offline invitation; instead, the system automatically collects statistics on the attention of a to-be-invited user and returns the results to the to-be-invited user. By applying the features of the present disclosure, the problem in the related technology that the approach for inviting a user to sign up for a microblog has a high cost and a low efficiency is solved, so as to automatically guide a user to sign up for the microblog, thereby achieving the effect of improving the efficiency of signing up for the microblog by the user and reducing the invitation cost.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

To describe the technical solutions of the various embodiments more clearly, the following briefly introduces the accompanying drawings required for describing the embodiments. The accompanying drawings in the following description show only some embodiments and a person of ordinary skill in the art may still derive other drawings from these accompanying drawings without creative efforts.

Corresponding reference numerals indicate corresponding parts throughout the several views of the drawings.

DETAILED DESCRIPTION

Example embodiments will now be described more fully with reference to the accompanying drawings.

It should be noted that various embodiments in the present disclosure and features in the embodiments may be combined with each other without conflicts. The present disclosure is described in detail below with reference to the accompanying drawings and the embodiments.

Before the embodiments are further detailed, a suitable computer architecture that can be used to implement the principle of the present application is described with reference to FIG. 1. In the description below, the various embodiments are described with reference to symbolic representations of acts and operations performed by one or more computers, unless indicated otherwise. As such, it should be understood that such acts and operations, which are at times referred to as being computer-executed, include the manipulation by a processing unit of a computer of electrical signals representing data in a structured form. This manipulation transforms the data or maintains it at locations in the memory system of the computer, which reconfigures or otherwise alters the operation of the computer in a manner well understood by a person skilled in the art. The data structures for maintaining data are physical locations of the memory that have particular properties defined by the format of the data. However, while the present disclosure is described in the foregoing context, it is not meant to be limiting as a person skilled in the art will appreciate that various of the acts and operations described hereinafter may also be implemented in hardware.

Figure 1:
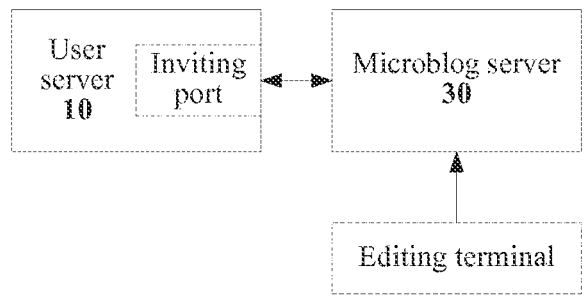
FIG. 1 is a structural diagram of a system for automatically prompting a user to sign up for a microblog according to various embodiments.

The present disclosure provides, by means of FIG. 1, a diagram illustrating computer architecture. For the purpose of description, the illustrated architecture is just one example of a suitable environment and is not intended to suggest any limitation as to the scope of use or function of the present disclosure. Nor should the computing system be interpreted as having any dependency or requirement relating to any one or combination of components shown in FIG. 1.

FIG. 1 is a structural diagram of a system for automatically prompting a user to sign up for a microblog according to various embodiments. As displayed in FIG. 1, the system for automatically prompting a user to sign up for a microblog includes one or more user servers 10 and a microblog server 30.

In various embodiments, each user server in the one or more user servers 10 is configured to save all information of a to-be-invited user and provide an inviting port to receive follow requests of microblog users. The microblog server 30 establishes communication with any one or more user servers 10 and is configured to, after the user server 10 receives the follow requests of the microblog users, acquire the follow requests, create pre-follow relationships according to the follow requests, and save the pre-follow relationships between the to-be-invited user and the microblog users that send the follow requests, so as to generate a pre-follow relationship table. In a case in which the number of all pre-follow relationships corresponding to the to-be-invited user is greater than or equal to a first threshold, a prompt message is sent to the to-be-invited user, so as to prompt the to-be-invited user to sign up for the microblog. In the various embodiments, the microblog server 30 automatically counts, after obtaining the pre-follow relationship table, the number of all pre-follow relationships corresponding to each to-be-invited user in the pre-follow relationship table.

In the various embodiments, after a to-be-invited user saved in the user server 10 receives a follow request, the microblog server 30 may acquire the follow request from the user server 10 and create a pre-follow relationship between the to-be-invited user and a microblog user that sends the follow request. Because the to-be-invited user receives follow requests of a large number of microblog users and each microblog user sends follow requests to different to-be-invited users, the generated pre-follow relationship table records all pre-follow relationships corresponding to each to-be-invited user. A system counts the current number of all pre-follow relationships corresponding to each to-be-invited user and generates and provides prompt information to the to-be-invited user when the number is greater than or equal to a predetermined threshold, and thus, the to-be-invited user joins the microblog according to the prompt information. Such an invitation approach does not involve offline invitation; instead, the system automatically collects statistics on the attention of a to-be-invited user and returns the result to the to-be-invited user. Therefore, in the existing technology, the approach for inviting a user to sign up for a microblog has a high cost and a low efficiency. Automatically guiding a user to sign up for the microblog thereby achieving the effect of improving the efficiency of signing up for the microblog by the user and reducing the invitation cost.

In the various embodiments, a music platform used to save singer information may be installed in the user server 10. The music platform includes basic information and music information of singers that currently attract considerable attention or have social influence. In this case, the music platform provides each to-be-invited user (namely, singer) with an inviting port to invite the to-be-invited user to join the microblog. In various embodiments, the inviting port may be a button associated with a singer on a singer page, a microblog user that wants to follow the singer may click the button so that a background system of the music platform receives a follow request, and the microblog server 30 having a communications relationship with the music platform acquires follow requests on the music platform sent by the microblog user to one or more singers, which indicates that the microblog user wants to follow these singers. In this case, the microblog server 30 creates pre-follow relationships between the microblog user and the corresponding singers and uses a pre-follow relationship table to save all pre-follow relationships. The microblog server 30 then counts the number of pre-follow relationships corresponding to each singer. Namely, the microblog server 30 obtains through statistics the attention of each singer, and in a case in which the attention reaches a particular degree (for example, when the number of the pre-follow relationships is greater than or equal to a value), the microblog server 30 generates prompt information to prompt the singer to join the microblog. In the various embodiments, an instant communications message, a pop-up prompt message, or an advertisement may be sent to an introduction page or music playback page of the singer on the music platform to inform that the singer has attracted attention from a crowd and invite the singer to join the microblog to further share his/her information. Therefore, according to the implementation manner, when a singer has not yet signed up for the microblog, the system may automatically guide a user to invite the singer to join the microblog and establish a pre-follow relationship between the user and the singer, so as to encourage the singer to sign up for the microblog. After the singer joins the microblog, the system automatically upgrades the existing pre-follow relationship to a follow relationship.

In the various embodiments, the microblog server 30 includes a first processor. The first processor is configured to determine whether a to-be-invited user has signed up to obtain a corresponding microblog account, namely, whether the to-be-invited user has joined the microblog. In a case in which the to-be-invited user has signed up to obtain the corresponding microblog account, the system enables microblog users that have pre-follow relationships with the to-be-invited user to follow microblog information of the to-be-invited user; otherwise, the system continues counting the number of pre-follow relationships corresponding to the to-be-invited user. In the various embodiments, while prompting a to-be-invited user to join the microblog, the system determines in advance whether a current to-be-invited user invited by a user has signed up for the microblog and, if the current to-be-invited user has joined the microblog, the system does not need to prompt the to-be-invited user to join the microblog. The foregoing operation aims to prevent a user that has joined the microblog from continuing frequently receiving invitation information so as not to cause unnecessary interference and aims to avoid waste of computer system resources. In this case, the system gives a prompt to the microblog user that sends the follow request, informs that the to-be-invited user has joined the microblog, and automatically enables the microblog user to follow information of the to-be-invited user.

Still using a singer as an example, when the singer knows, by means of prompt information, that a large number of microblog users invite the singer to join the microblog and the singer joins the microblog to share his/her information, if the microblog server 30 detects, by detecting that the singer has signed up to obtain a corresponding microblog account, that the invited singer joins the microblog, pre-follow relationships of the microblog users that have invited the singer are automatically converted into follow relationships and the microblog users can then automatically follow information shared by the singer If there are other microblog users sending follow requests, no more prompt messages are sent to the singer, so as to prevent the singer from receiving unnecessary prompts.

The system for automatically prompting a user to sign up for a microblog according to various embodiments may further include an editing terminal. The editing terminal is configured to acquire, according to pre-follow relationships recorded in the pre-follow relationship table, a to-be-invited user list and a to-be-invited user dictionary that correspond to each microblog user. When the microblog user is enabled to follow microblog information of a to-be-invited user, a corresponding relationship between an identifier (ID) recorded on the music platform of the to-be-invited user in the to-be-invited user dictionary and a microblog account recorded on the microblog server of the to-be-invited user are created. In the various embodiments, the editing terminal acquires information of all to-be-invited users corresponding to each microblog user by using the saved pre-follow relationships and saves, in a memory and/or database, the acquired to-be-invited user list and to-be-invited user dictionary that correspond to the microblog user. Specifically, the acquired to-be-invited user list and to-be-invited user dictionary that correspond to the microblog user may be first saved in the memory and then read to the database and the ID of the to-be-invited user in the to-be-invited user dictionary needs to be read from the memory or the database before the corresponding relationship between the ID of the to-be-invited user and the microblog account of the to-be-invited user is created.

From the above that, after a to-be-invited user joins the microblog, the editing terminal begins to maintain and manage a matching relationship between a microblog account of the user and an ID of the to-be-invited user. For example, once a singer on the music platform is invited and joins the microblog, the editing terminal associates a microblog account of the singer with a singer ID of the singer on the music platform and may further modify the microblog status of the singer on the music platform.

In various embodiments, the function of the editing terminal provided in the foregoing embodiment may be incorporated into the microblog server 30 and serve as a functional module in the microblog server 30 to perform the same function. This solution may save resources.

According to various embodiments of the system for automatically prompting a user to sign up for a microblog shown in FIG. 1, the user server 10 in the various embodiments may include: an inviting port, configured to receive a follow request of a microblog user, and a second processor, configured to determine whether the microblog user has joined the microblog. Specifically, in a case in which the microblog user has joined the microblog, the second processor creates and saves a pre-follow relationship between the to-be-invited user and the microblog user that sends the follow request. In a case in which the second processor determines that the microblog user has not joined the microblog, the second processor may prompt the microblog user to sign up for the microblog and create and save, after the microblog user signs up for microblog, a pre-follow relationship between the to-be-invited user and the microblog user that sends the follow request.

The principle of the present application is operational with other general purpose or special purpose computing or communication environments or configurations. Examples of well-known computing systems, environments, and configurations that may be suitable for use with the present application include, but are not limited to, personal computers, servers, multiprocessor systems, microprocessor-based systems, mini computers, mainframe computers, and distributed computing environments that include any of the foregoing systems or devices.

The system for automatically prompting a user to sign up for a microblog according to various embodiments is described in detail above.

Figure 2:
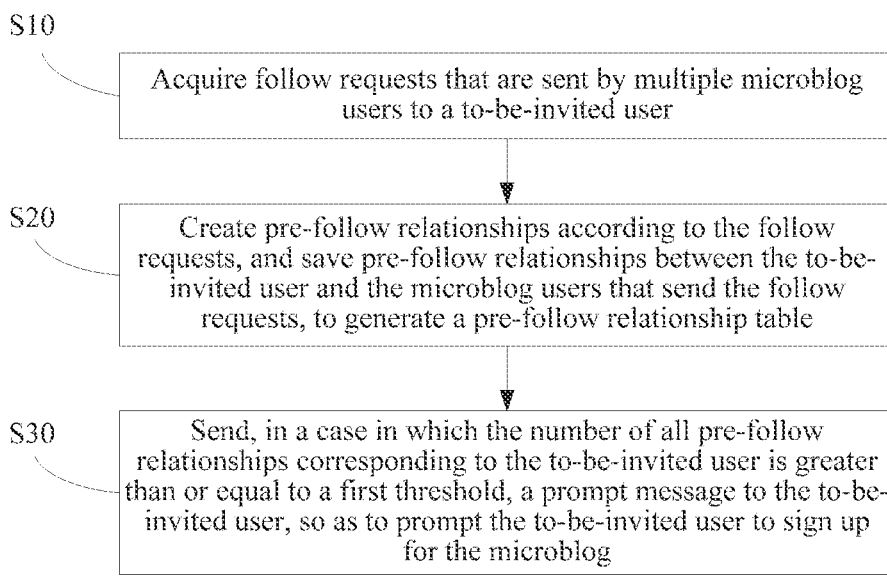
FIG. 2 is a flowchart of a method for automatically prompting a user to sign up for a microblog according to various embodiments.
Figure 3:
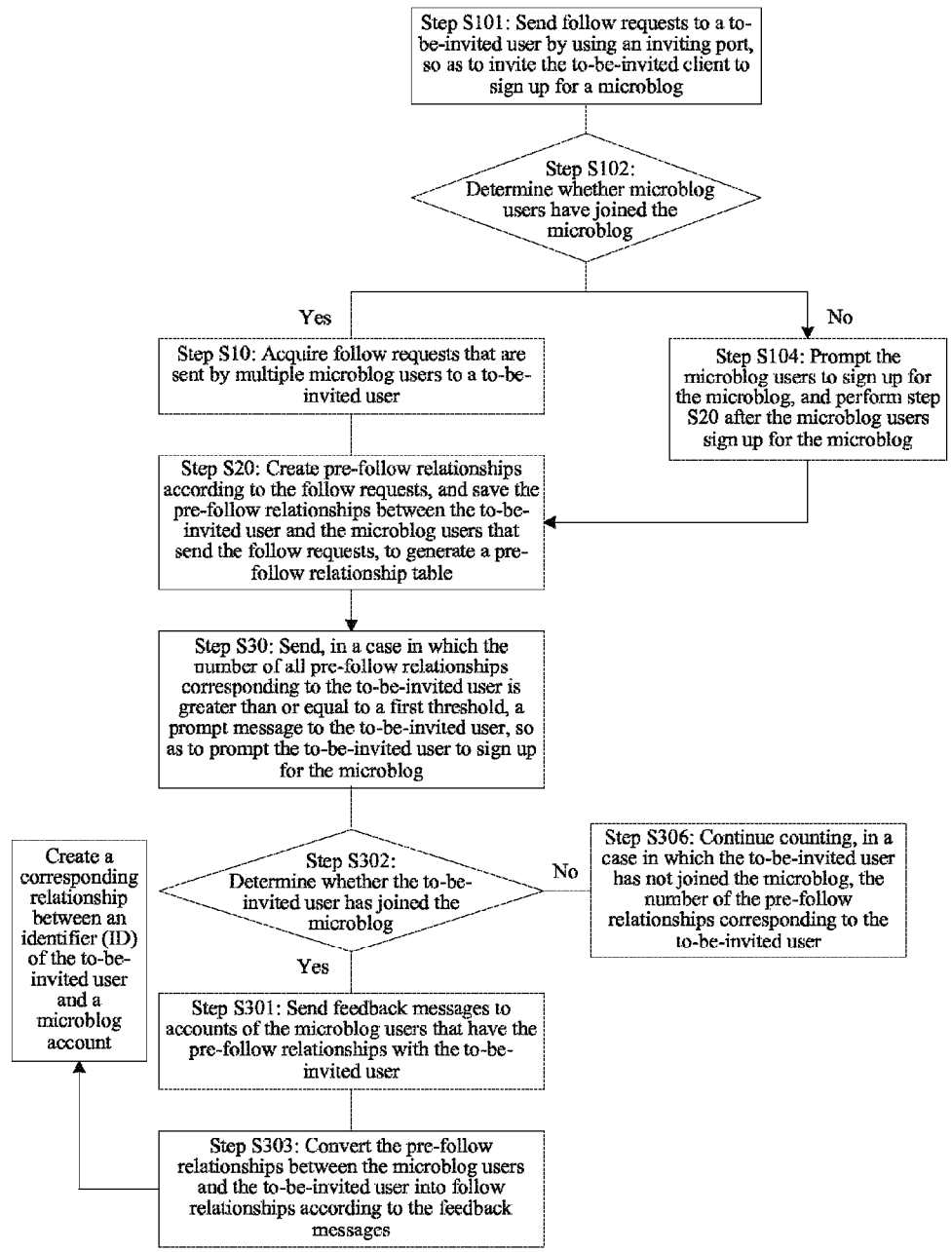
FIG. 3 is a detailed flowchart of a preferred method for automatically prompting a user to sign up for a microblog according to various embodiments.

FIG. 2 is a flowchart of a method for automatically prompting a user to sign up for a microblog according to various embodiments. FIG. 3 is a detailed flowchart of a preferred method for automatically prompting a user to sign up for a microblog according to the various embodiments.

The method for automatically prompting a user to sign up for a microblog shown in FIG. 2 may include at least the following:

S10: Acquire follow requests that are sent by multiple microblog users to a to-be-invited user. In the various embodiments, the follow requests acquired in the foregoing step may be extracted from information that has been received from other servers. For example, the follow requests may be extracted from a user server having a communications relationship with a current microblog platform; in this case, an invited user on the user server has received inviting requests of microblog users on the current microblog platform. Specifically, the user server may receive the follow requests of the microblog users by using an inviting port.

S20: Create pre-follow relationships according to the follow requests and save the pre-follow relationships between the to-be-invited user and the microblog users that send the follow requests to generate a pre-follow relationship table. In the various embodiments, the pre-follow relationship table in this step includes all pre-follow relationships corresponding to each to-be-invited user.

S30: Send, in a case in which the number of all pre-follow relationships corresponding to the to-be-invited user is greater than or equal to a first threshold, a prompt message to the to-be-invited user, so as to prompt the to-be-invited user to sign up for the microblog. In the various embodiments, the first threshold in this step may be preset in a system according to requirements. Specifically, the first threshold may be calculated by means of a statistical algorithm to obtain the number of all the pre-follow relationships corresponding to each to-be-invited user in the pre-follow relationship table.

In the various embodiments, after a to-be-invited user receives a follow request sent by a microblog user, the follow request is acquired and a pre-follow relationship between the to-be-invited user and the microblog user that sends the follow request is created. Because the to-be-invited user receives follow requests of a large number of microblog users, and each microblog user sends follow requests to different to-be-invited users, the generated pre-follow relationship table records all pre-follow relationships corresponding to each to-be-invited user. A system counts the current number of all pre-follow relationships corresponding to each to-be-invited user and generates and provides prompt information to the to-be-invited user when the number is greater than or equal to a predetermined threshold, and thus, the to-be-invited user joins the microblog according to the prompt information. Such an invitation approach does not involve offline invitation; instead, the system automatically collects statistics on the attention of a to-be-invited user and returns the result to the to-be-invited user in time. Therefore, the problem in the existing technology that the approach for inviting a user to sign up for a microblog has a high cost and a low efficiency is solved, so as to automatically guide a user to sign up for the microblog, thereby achieving the effect of improving the efficiency of signing up for the microblog by the user and reducing the invitation cost.

The method for automatically prompting a user to sign up for a microblog according to various embodiments is described in detail above.

According to various embodiments, a preferred method for automatically prompting a user to sign up for a microblog is further provided.

Specifically, as shown in FIG. 3, in S30, after sending a prompt message to the to-be-invited user, so as to prompt the to-be-invited user to sign up for the microblog, the foregoing method may further include at least the following steps:

S301: Send, after the to-be-invited user detects that the to-be-invited user has a corresponding microblog account, that is, the to-be-invited user has signed up for the microblog and obtained a corresponding microblog account, feedback messages to the microblog users that have the pre-follow relationships with the to-be-invited user. In the various embodiments, it may be determined, upon detecting a microblog account of the to-be-invited user, that the to-be-invited user joins the microblog according to the received prompt information. Specifically, after the to-be-invited user joins the microblog, direct messages or tips titles may be used as feedback messages to inform the microblog user that have invited the to-be-invited user to sign up for the microblog.

S303: Convert the pre-follow relationships between the microblog users and the to-be-invited user into follow relationships according to the feedback messages; so that the microblog users are enabled to follow microblog information of the to-be-invited user. That is, the system automatically upgrades the pre-follow relationships between the microblog users and the to-be-invited user to microblog follow relationships.

As shown in FIG. 3, in S30, after sending a prompt message to the to-be-invited user, so as to prompt the to-be-invited user to sign up for the microblog, the foregoing method may further include at least the following:

S302: Determine whether the to-be-invited user has signed up to obtain a corresponding microblog account; that is, determine whether the to-be-invited user has joined the microblog. In a case in which the to-be-invited user has joined the microblog, perform S304; otherwise, perform S306.

S304: Enable the microblog users that have the pre-follow relationships with the to-be-invited user to follow microblog information of the to-be-invited user. This step may be replaced by S301 and S303; that is, the sending feedback messages and then converting the pre-follow relationships into follow relationships is replaced with directly enabling the microblog users that have the pre-follow relationships to follow microblog information.

S306: Continue counting, in a case in which the to-be-invited user has not joined the microblog, the number of the pre-follow relationships corresponding to the to-be-invited user.

Figure 4:
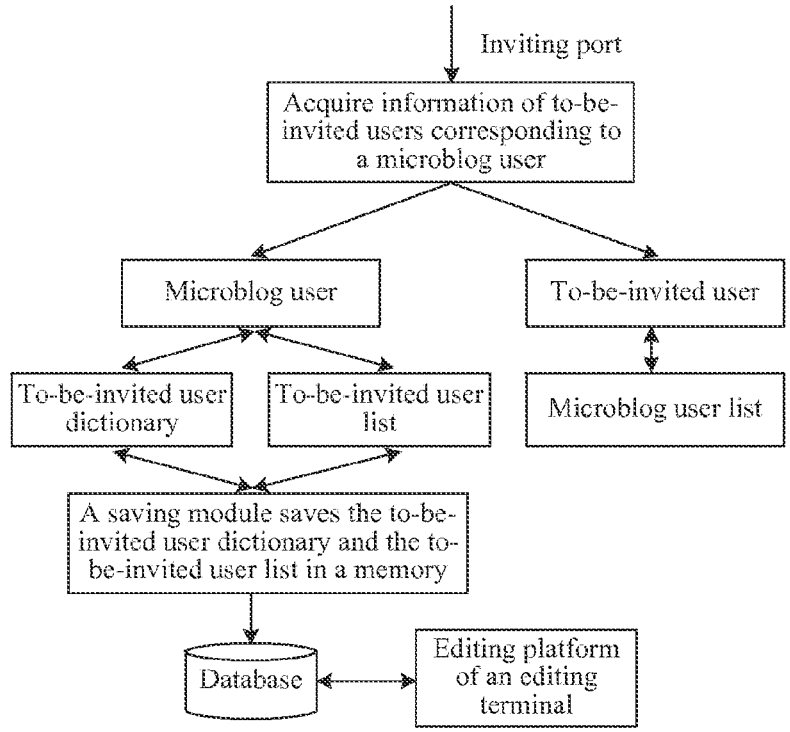
FIG. 4 is a diagram of a method for processing association information between a microblog user and an invited user according to various embodiments.

In the various embodiments, the pre-follow relationship table may include all pre-follow relationships corresponding to each to-be-invited user. In S20, after the pre-follow relationship table is generated, the foregoing method may further include at least the following steps:

S201: Acquire, according to the pre-follow relationships recorded in the pre-follow relationship table, information of all to-be-invited users corresponding to each microblog user, so as to acquire a to-be-invited user list and a to-be-invited user dictionary that correspond to the microblog user. As shown in FIG. 4, by using S201, information of to-be-invited users corresponding to a microblog user is downloaded according to the pre-follow relationships recorded in the pre-follow relationship table. The information may include, but is not limited to, a to-be-invited user list (for example, a singer list) and a to-be-invited user dictionary (for example, a singer dictionary).

Specifically, in the foregoing S201, information of a corresponding to-be-invited user may be downloaded from the user server 10 by using the microblog server 30 in FIG. 1. In this case, the microblog user has sent a follow request to the to-be-invited user. For example, a microblog user on the microblog server 30 logging in to the microblog platform has sent a follow request to a singer on the music platform and the microblog server 30 downloads information of the singer. Because the current microblog user can invite multiple singers at the same time, the acquired to-be-invited user list may include, but is not limited to, information such as an identifier (ID) or a name of a user and the to-be-invited user dictionary may include, but is not limited to, data associated with the user, for example, all songs of the singer.

S203: Save, in a memory and/or database, the to-be-invited user list and the to-be-invited user dictionary that correspond to the microblog user. Specifically, a pre-follow relationship storage system is established by using this step. As shown in detail in FIG. 4, a saving module may be used to save, in the memory, an inviting relationship between the microblog user and the to-be-invited users, and then save the inviting relationship in the database.

After S303 and the enabling the microblog users to follow microblog information of the to-be-invited user in S304 in the various embodiments and as shown in FIG. 3 are completed, the microblog server 30 shown in FIG. 1 begins to read an ID of the to-be-invited user from the to-be-invited user dictionary and creates, by using an editing terminal, a corresponding relationship between the ID of the to-be-invited user and the microblog account of the to-be-invited user. Specifically, as shown in FIG. 4, an editing platform on the editing terminal reads data in the database to realize the process of creating the corresponding relationship, so as to maintain and manage the corresponding relationship between the microblog account and the ID of the invited user.

In the various embodiments and as shown in FIG. 3, in S10, before acquiring follow requests that are sent by multiple microblog users to a to-be-invited user, the foregoing method may further include at least the following:

S101: Receive, by using an inviting port, the follow requests triggered by the microblog users and sent to the to-be-invited user, so as to invite the to-be-invited client to sign up for the microblog. For example, on the user server 10 shown in FIG. 1, such as the music platform, for a singer that has not yet joined the microblog, the function for subsequent microblog users to guide the singer to join the microblog is recognized by adding an inviting port "Invite to Join" to the singer page on the music platform.

S102: Determine whether the microblog users have joined the microblog. In the various embodiments, in a case in which the microblog users have joined the microblog, S10 is performed; otherwise, S104 is performed.

S10: Acquire the follow requests, and then perform S20 of creating and saving pre-follow relationships between the to-be-invited user and the microblog users that send the follow requests.

S104: Prompt, in a case in which the microblog users have not joined the microblog, the microblog users to sign up for the microblog, and after the microblog users sign up for the microblog, perform S20 of creating and saving pre-follow relationships between the to-be-invited user and the microblog users that send the follow requests.

The method for automatically prompting a user to sign up for a microblog according to various embodiments is described in detail above.

According to various embodiments, a method for a newly registered microblog user to invite a singer to join the microblog is further provided.

Figure 5:
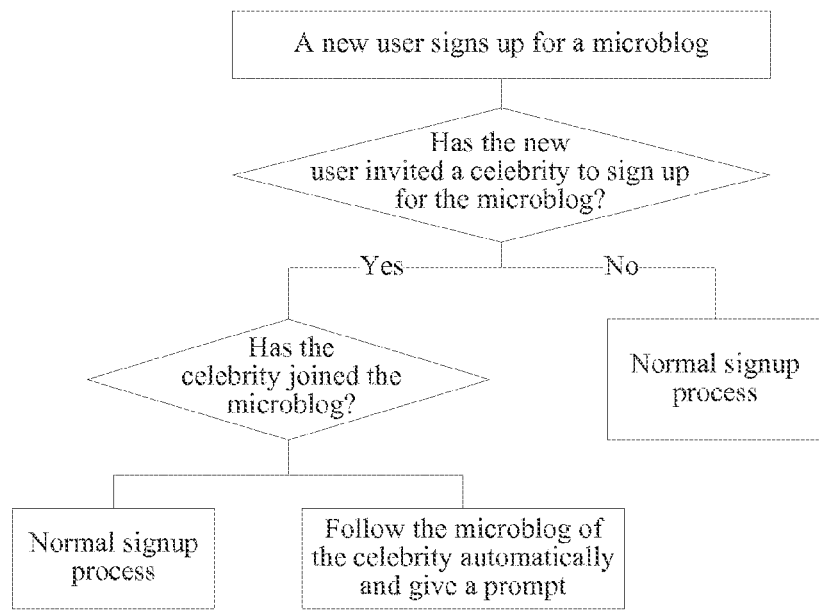
FIG. 5 is a flowchart of a method for a new microblog user to invite a user to join a microblog according to various embodiments.

As shown in FIG. 5, various embodiments of the further provide a method for a newly registered microblog user to invite a singer to join the microblog. First, a query is made to find out whether a newly registered user has invited a celebrity (for example, a singer) of interest to sign up for the microblog, and if yes, whether the celebrity has signed up and joined the microblog is determined. If the celebrity has signed up for the microblog, the microblog of the celebrity is followed automatically, otherwise, the system enters the invitation process of the various embodiments shown in FIG. 2 and FIG. 3.

It should be noted that the methods illustrated in the accompanying flowcharts may be performed in a computer system such as a set of computer-executable instructions. Moreover, although the flowcharts illustrate a logical sequence, the illustrated or described steps may be performed in a sequence different from the sequence here in some cases.

Preferably, the present application may further provide a computer program for performing the various embodiments shown in FIG. 2 through FIG. 5 and a carrier for saving the computer program; that is, the various embodiments may operate in accordance with the law of nature by using suitable computer architecture. Additionally, although the present disclosure is described in the foregoing context, the foregoing computer program for performing the steps is not meant to be limiting as several of the described acts and operations may also be implemented in hardware.

The principle of the present disclosure is operational with other general purpose or special purpose computing or communication environments or configurations. Examples of well-known computing systems, environments, and configurations that may be suitable for use with the present disclosure include, but are not limited to, personal computers, servers, multiprocessor systems, microprocessor-based systems, mini computers, mainframe computers, and distributed computing environments that include any of the foregoing systems or devices.

The method for a newly registered microblog user to invite a singer to join the microblog according to various embodiments is described in detail above.

According to various embodiments, an apparatus for automatically prompting a user to sign up for a microblog is further provided.

Figure 6:
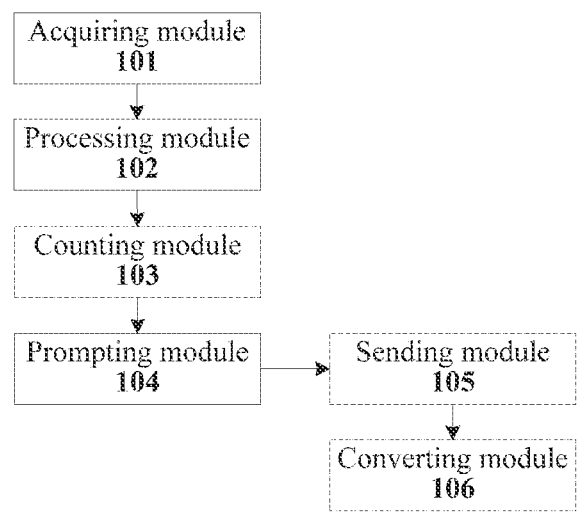
FIG. 6 is a structural diagram of an apparatus for automatically prompting a user to sign up for a microblog according to various embodiments.

FIG. 6 is a structural diagram of an apparatus for automatically prompting a user to sign up for a microblog according to various embodiments. As shown in FIG. 6, the apparatus includes an acquiring module 101, a processing module 102, and a prompting module 104.

In the various embodiments, the acquiring module 101 acquires follow requests that are sent by multiple microblog users to a to-be-invited user. The processing module 102 creates pre-follow relationships according to the follow requests and saves the pre-follow relationships between the to-be-invited user and the microblog users that send the follow requests to generate a pre-follow relationship table. The prompting module 104 sends, in a case in which the number of all pre-follow relationships corresponding to the to-be-invited user is greater than or equal to a first threshold, a prompt message to the to-be-invited user, so as to prompt the to-be-invited user to sign up for the microblog.

In various embodiments, the foregoing apparatus may further include a counting module 103, which counts the number of all pre-follow relationships corresponding to each to-be-invited user in the pre-follow relationship table.

In the various embodiments, after a to-be-invited user receives a follow request sent by a microblog user, the acquiring module 101 acquires the follow request and the processing module 102 is used to create a pre-follow relationship between the to-be-invited user and the microblog user that sends the follow request. Because the to-be-invited user receives follow requests from a large number of microblog users, and each microblog user sends follow requests to different to-be-invited users, the generated pre-follow relationship table records all pre-follow relationships corresponding to each to-be-invited user. After a system counts, by using the counting module 103, the current number of all pre-follow relationships corresponding to each to-be-invited user, prompt information is generated and provided to the to-be-invited user if the number is greater than or equal to a predetermined threshold, and thus, the prompting module 104 prompts the to-be-invited user to join the microblog according to the prompt information. Such an invitation approach does not involve offline invitation; instead, the system automatically collects statistics on the attention of a to-be-invited user and returns the result to the to-be-invited user. Therefore, the problem in the existing technology that the approach for inviting a user to sign up for a microblog has a high cost and a low efficiency is solved, so as to automatically guide a user to sign up for the microblog, thereby achieving the effect of improving the efficiency of signing up for the microblog by the user and reducing the invitation cost.

In various embodiments, the foregoing apparatus may further include a sending module 105 and a converting module 106. The sending module 105 sends, after it is detected that the to-be-invited user has signed up to obtain a corresponding microblog account, feedback messages to the microblog users that have the pre-follow relationships with the to-be-invited user. The converting module 106 converts the pre-follow relationships between the microblog users and the to-be-invited user into follow relationships according to the feedback messages, so that the microblog users are enabled to follow microblog information of the to-be-invited user.

In various embodiments, the foregoing apparatus may further include a determining module, an enabling module, and an executing module. The determining module determines whether the to-be-invited user has signed up to obtain a corresponding microblog account. The enabling module enables, in a case in which the to-be-invited user has signed up to obtain the corresponding microblog account, the microblog users that have the pre-follow relationships with the to-be-invited user to follow microblog information of the to-be-invited user. The executing module begins to execute the counting module 103 in a case in which the to-be-invited user has not signed up to obtain the corresponding microblog account; that is, the executing module causes the counting module 103 to continue counting the number of the pre-follow relationships corresponding to the to-be-invited user.

According to various embodiments, the method for automatically prompting a user to sign up for a microblog shown in FIG. 2 and FIG. 3 may be a method for automatically prompting a user to sign up for a microblog that is performed by the units in the apparatus for automatically prompting a user to sign up for a microblog shown in FIG. 6. For example, S10 shown in FIG. 2 may be performed by the acquiring module 101 shown in FIG. 6, S20 shown in FIG. 2 may be performed by the processing module 102 shown in FIG. 6, S30 shown in FIG. 2 may be performed by the prompting module 104 shown in FIG. 6, S301 shown in FIG. 3 may be performed by the sending module 105 shown in FIG. 6, S303 shown in FIG. 3 may be performed by the converting module 106 shown in FIG. 6, and S306 shown in FIG. 3 may be performed by the counting module 103 shown in FIG. 6.

According to various embodiments, the units in the apparatus for automatically prompting a user to sign up for a microblog shown in FIG. 6 may be separately or wholly combined into one or more other units, or a unit (some units) therein may further be split into multiple smaller units in function, which can realize the same operation without affecting the technical effect of the various embodiments. The foregoing units are divided according to logical functions. In a practical application, the function of one unit may also be realized by multiple units, or the functions of multiple units may be realized by one unit. In various other embodiments, the apparatus for automatically prompting a user to sign up for a microblog may also include other modules. However, in a practical application, these functions may also be realized with the assistance of other units and may be realized by multiple units in cooperation.

According to various embodiments, a computer program (including program code) capable of performing the method for automatically prompting a user to sign up for a microblog shown in FIG. 2 and FIG. 3 can be run on a general purpose computing device, such as a computer, that includes processing elements and a storage medium, so as to construct the apparatus for automatically prompting a user to sign up for a microblog shown in FIG. 6, and to realize the method for automatically prompting a user to sign up for a microblog according to various. The computer program may be recorded on, for example, a computer-readable recording medium, and loaded and run in the foregoing computing device by means of the computer-readable recording medium.

The storage medium may include a flash disk, a read-only memory (ROM), a random access memory (RAM), a magnetic disk, an optical disc, or the like.

It can be seen from the foregoing embodiments that the present disclosure achieves the following technical effect: the problem in the existing technology that the approach for inviting a user to sign up for a microblog has a high cost and a low efficiency is solved, so as to automatically guide a user to sign up for the microblog, thereby achieving the effect of improving the efficiency of signing up for the microblog by the user and reducing the invitation cost.

One skilled in the art should understand that the foregoing modules or steps in the present disclosure may be implemented by using a general purpose computing device. The modules or steps may be integrated in a single computing device or distributed on a network formed by multiple computing devices. Optionally, the modules or steps may be implemented by program code executable by a computing device so that the modules or steps may be stored in a storage device and executed by the computing device, or the modules or steps are separately made into integrated circuit modules, or multiple of the modules or steps are made into a single integrated circuit module. In this way, the present disclosure is not limited to any specific combination of hardware and software.

The foregoing descriptions are merely preferred embodiments of the present application, but are not intended to limit the present application. One skilled in the art can make alterations and variations to the present application. Any modification, equivalent replacement, or improvement made within the spirit and principle of the present disclosure shall fall within the protection scope of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

What is claimed is:

1. A method for automatically prompting a user to sign up for a microblog, comprising:
    acquiring follow requests that are sent by multiple microblog users to a to-be-invited user;
    creating pre-follow relationships according to the follow requests, and saving the pre-follow relationships between the to-be-invited user and the microblog users that send the follow requests, to generate a pre-follow relationship table; and
    sending, in a case in which the number of all pre-follow relationships corresponding to the to-be-invited user is greater than or equal to a first threshold, a prompt message to the to-be-invited user, so as to prompt the to-be-invited user to sign up for the microblog.

2. The method according to claim 1, wherein after the step of sending a prompt message to the to-be-invited user, so as to prompt the to-be-invited user to sign up for the microblog, the method comprises:
    sending, after detecting that the to-be-invited user has a corresponding microblog account, feedback messages to accounts of the microblog users that have the pre-follow relationships with the to-be-invited user; and
    converting the pre-follow relationships between the microblog users and the to-be-invited user into follow relationships according to the feedback messages.

3. The method according to claim 1, wherein after the step of sending a prompt message to the to-be-invited user, so as to prompt the to-be-invited user to sign up for the microblog, the method comprises:
    determining whether the to-be-invited user has signed up to obtain a corresponding microblog account.

4. The method according to claim 3, wherein in a case in which the to-be-invited user has signed up to obtain the corresponding microblog account, a step of enabling the microblog users that have the pre-follow relationships with the to-be-invited user and following microblog information of the to-be-invited user is performed; and
    in a case in which the to-be-invited user has not signed up to obtain the corresponding microblog account, a step of continuing counting the number of the pre-follow relationships corresponding to the to-be-invited user is performed.

5. The method according to claim 2, wherein the pre-follow relationship table comprises all pre-follow relationships corresponding to each to-be-invited user, and after the pre-follow relationship table is generated, the method comprises:
    acquiring, according to the pre-follow relationships recorded in the pre-follow relationship table, information of all to-be-invited users corresponding to each microblog user, so as to acquire a to-be-invited user list and a to-be-invited user dictionary that correspond to the microblog user;
    saving, in a memory and/or database, the to-be-invited user list and the to-be-invited user dictionary that correspond to the microblog user;
    reading an identifier (ID) of the to-be-invited user from the to-be-invited user dictionary after the microblog user is enabled to follow the microblog information of the to-be-invited user; and
    creating a corresponding relationship between the ID of the to-be-invited user and the microblog account.

6. The method according to claim 1, wherein before the step of acquiring follow requests that are sent by multiple microblog users to a to-be-invited user, the method comprises:
    receiving the follow requests of the microblog users by using an inviting port; and
    determining whether the microblog users have joined the microblog.

7. The method according to claim 6, wherein in a case in which the microblog users have joined the microblog, the step of creating and saving pre-follow relationships between the to-be-invited user and the microblog users that send the follow requests, to generate a pre-follow relationship table is performed; and
    in a case in which the microblog users have not joined the microblog, the microblog users are prompted to sign up for the microblog, and after the microblog users sign up for the microblog, the step of creating and saving pre-follow relationships between the to-be-invited user and the microblog users that send the follow requests, to generate a pre-follow relationship table is performed.

8. An apparatus for automatically prompting a user to sign up for a microblog, comprising:

an acquiring module, configured to acquire follow requests that are sent by multiple microblog users to a to-be-invited user;

a processing module, configured to create pre-follow relationships according to the follow requests, and save the pre-follow relationships between the to-be-invited user and the microblog users that send the follow requests, to generate a pre-follow relationship table; and a prompting module, configured to send, in a case in which the number of all pre-follow relationships corresponding to the to-be-invited user is greater than or equal to a first threshold, a prompt message to the to-be-invited user, so as to prompt the to-be-invited user to sign up for the microblog.

9. The apparatus according to claim 8, further comprising:

a sending module, configured to send feedback messages to the microblog users that have the pre-follow relationships with the to-be-invited user; and a converting module, configured to convert the pre-follow relationships between the microblog users and the to-be-invited user into follow relationships according to the feedback messages, so that the microblog users are enabled to follow microblog information of the to-be-invited user.

10. The apparatus according to claim 8, further comprising:

a determining module, configured to determine whether the to-be-invited user has signed up to obtain a corresponding microblog account.

11. The apparatus according to claim 10, further comprising: an enabling module, configured to enable, in a case in which the to-be-invited user has signed up to obtain the corresponding microblog account, the microblog users that have the pre-follow relationships with the to-be-invited user to follow microblog information of the to-be-invited user.

12. The apparatus according to claim 11, further comprising: an executing module, configured to return to execute a counting module in a case in which the to-be-invited user has not signed up to obtain the corresponding microblog account.

13. A system for automatically prompting a user to sign up for a microblog, comprising:

one or more user servers, configured to save all information of a to-be-invited user, and provide an inviting port to receive follow requests of microblog users; and a microblog server, which establishes communication with any one or more user servers, and is configured to acquire the follow requests, create pre-follow relationships according to the follow requests, and save the pre-follow relationships between the to-be-invited user and the microblog users that send the follow requests, in a case in which the number of all pre-follow relationships corresponding to the to-be-invited user is greater than or equal to a first threshold, a prompt message being sent to the to-be-invited user, so as to prompt the to-be-invited user to sign up for the microblog.

14. The system according to claim 13, wherein the microblog server comprises:

a first processor, configured to determine whether the to-be-invited user has signed up to obtain a corresponding microblog account, wherein in a case in which the to-be-invited user has signed up to obtain the corresponding microblog account, the microblog users that have the pre-follow relationships with the to-be-invited users are enabled to follow microblog information of the to-be-invited user.

15. The system according to claim 14, further comprising:

an editing terminal, configured to acquire, according to the pre-follow relationships, a to-be-invited user list and a to-be-invited user dictionary that correspond to each microblog user, wherein when the microblog user is enabled to follow the microblog information of the to-be-invited user, an identifier (ID) of the to-be-invited user is read from the to-be-invited user dictionary, and a corresponding relationship between the ID of the to-be-invited user in the to-be-invited user dictionary and the microblog account is created.

16. The system according to claim 13, wherein the user server comprises:

the inviting port, configured to receive the follow requests of the microblog users; and a second processor, configured to determine whether the microblog users have joined the microblog, wherein in a case in which the microblog users have not joined the microblog, the microblog users are prompted to sign up for the microblog.

* * * * *

UNITED STATES PATENT AND TRADEMARK OFFICE
CERTIFICATE OF CORRECTION

PATENT NO. : 9,680,788 B2  
APPLICATION NO. : 14/695198  
DATED : June 13, 2017  
INVENTOR(S) : Lihua Huang Page 1 of 1

It is certified that error appears in the above-identified patent and that said Letters Patent is hereby corrected as shown below:

On the Title Page  
Add Item (30) Foreign Application Priority Data  
Oct. 24, 2012 (CN) 2012 1 04104087

Signed and Sealed this  
Twelfth Day of September, 2017

Joseph Matal  
*Performing the Functions and Duties of the*  
*Under Secretary of Commerce for Intellectual Property and*  
*Director of the United States Patent and Trademark Office*